(12) United States Patent
Watanabe et al.

(10) Patent No.: US 10,931,213 B2
(45) Date of Patent: Feb. 23, 2021

(54) CONTROL APPARATUS FOR A SYNCHRONOUS MOTOR

(71) Applicant: Toshiba Mitsubishi-Electric Industrial Systems Corporation, Chuo-ku (JP)

(72) Inventors: Fumio Watanabe, Tokyo (JP); Masashi Nakamura, Tokyo (JP)

(73) Assignee: Toshiba Mitsubishi-Electric Industrial Systems Corporation, Chuo-ku (JP)

( * ) Notice: Subject to any disclaimer, the term of this patent is extended or adjusted under 35 U.S.C. 154(b) by 0 days.

(21) Appl. No.: 16/528,129

(22) Filed: Jul. 31, 2019

(65) Prior Publication Data

US 2019/0356248 A1    Nov. 21, 2019

Related U.S. Application Data

(63) Continuation of application No. PCT/JP2017/003307, filed on Jan. 31, 2017.

(51) Int. Cl.
*H02P 6/16* (2016.01)
*H02P 1/22* (2006.01)
(Continued)

(52) U.S. Cl.
CPC ............... *H02P 1/22* (2013.01); *H02P 6/16* (2013.01); *H02P 21/22* (2016.02); *H02P 21/24* (2016.02); *H02P 27/06* (2013.01)

(58) Field of Classification Search
CPC .. H02P 21/10; H02P 6/18; H02P 27/12; H02P 21/18; H02P 21/34
See application file for complete search history.

(56) References Cited

U.S. PATENT DOCUMENTS 5,144,564 A * 9/1992 Naidu ............... H02P 6/18
                                                           318/721
5,585,709 A * 12/1996 Jansen .............. H02K 17/165
                                                           318/720
(Continued)

FOREIGN PATENT DOCUMENTS

JP    10-291241 A    11/1998
JP    2004-266935 A   9/2004
JP    2013-31256 A    2/2013

OTHER PUBLICATIONS

International Search Report dated Apr. 11, 2017 in PCT/JP2017/003307 filed Jan. 31, 2017.

*Primary Examiner* — Rina I Duda
(74) *Attorney, Agent, or Firm* — Oblon, McClelland, Maier & Neustadt, L.L.P.

(57) ABSTRACT

A drive control unit that performs vector control of a synchronous motor determines reference phase angles of 3-phase/DQ converters, and a DQ/3-phase converter. When speed of a synchronous motor is equal to or higher than a predetermined threshold value, the reference phase angle is obtained by adding a correction angle such that D-axis voltage feedback output from 3-phase/DQ converter becomes zero to the detection angle of a position detector. And when the speed of the synchronous motor is less than a predetermined threshold value, the reference phase angle is obtained by adding a low speed load angle set in advance to the detection angle of the position detector. In a vector control operation, a power factor is achieved by controlling the D-axis current to be zero.

8 Claims, 5 Drawing Sheets

(51) Int. Cl.
*H02P 21/22* (2016.01)
*H02P 21/24* (2016.01)
*H02P 27/06* (2006.01)

(56) References Cited

U.S. PATENT DOCUMENTS

| | | | |
|---|---|---|---|
| 6,163,130 A | 12/2000 | Neko et al. | |
| 6,636,012 B2 * | 10/2003 | Royak | H02P 6/185 318/490 |
| 2005/0104551 A1 | 5/2005 | Nishimura et al. | |
| 2014/0210387 A1 | 7/2014 | Zhao et al. | |

* cited by examiner

CONTROL APPARATUS FOR A SYNCHRONOUS MOTOR

CROSS-REFERENCE TO RELATED APPLICATION

This application is based upon and claims the benefit of priority from the prior PCT Patent Application No. PCT/JP2017/003307, filed on Jan. 31, 2017, the entire contents of which are incorporated herein by reference.

TECHNICAL FIELD

The present invention relates to a control apparatus for a synchronous motor, and more particularly to a control apparatus for a synchronous motor using vector control.

BACKGROUND ART

A control apparatus for a synchronous motor that drive and control the synchronous motor is widely used. For example, in applications where the load changes greatly, so-called vector control is used. In this case, in order to drive and control the synchronous motor efficiently within a predetermined range of the capacity of the driving inverter, it is necessary to make the output current smaller. Therefore, the power factor of the synchronous motor is controlled to 1. In order to achieve this purpose, it is proposed to calculate a load angle of the synchronous motor by calculating a magnetic flux from the constant of the synchronous motor and the currents of the synchronous motor which change depending on the load, and to obtain the current reference such that the power factor becomes 1. (See, for example, Patent Document 1).

PRIOR ART DOCUMENT

Patent Document

Patent document 1: Japanese Patent Application Publication No. 2013-31256

SUMMARY OF THE INVENTION

Problem To Be Solved By The Invention

According to the method of Patent Document 1, it is possible to operate with the power factor of the synchronous motor being 1. However, since the constant of the synchronous motor is used for the calculation, not only it is necessary to measure this constant accurately, but also the calculation to change the constant according to the load becomes complicated.

The present invention has been made in view of the above problems, and an object thereof is to provide a control apparatus for a synchronous motor capable of setting the power factor of the synchronous motor to 1 by a relatively simple method.

Means For Solving The Problem

In order to achieve the above-mentioned purpose, the control apparatus for a synchronous motor of the present invention has an inverter that converts power supplied from an AC power supply into a desired output voltage and frequency to drive a synchronous motor, a current detector for detecting the output current of the inverter, a voltage detector for detecting an output voltage of the inverter, a position detector for detecting the rotation angle of the synchronous motor, and a drive controller that controls an output of the inverter, the drive controller comprises a speed controller for controlling the speed feedback obtained by differentiating the output of the position detector to be a predetermined speed reference and outputting a Q-axis current reference, first 3-phase/DQ converter for obtaining a Q-axis feedback current and a D-axis feedback current by converting a detected current of the current detector into 3-phase/DQ converter, a Q-axis current controller for controlling the deviation between the Q-axis current reference and the Q-axis feedback current to be zero and outputting a Q-axis voltage reference, a D-axis current controller for controlling the D-axis feedback current to be zero and outputting a D-axis voltage reference, a DQ/3-phase converter for DQ to 3-phase conversion of the Q-axis voltage reference and the D-axis voltage reference to obtain voltage reference of each phase of the three-phase output of the inverter, a PWM controller for PWM controlling the voltage reference of each phase and outputting a gate signal to switching elements constituting the inverter, second 3-phase/DQ converter for obtaining a Q-axis feedback voltage and a D-axis feedback voltage by converting the detection voltage of the voltage detector into 3-phase/DQ converter, and a voltage controller for PI control so that the D-axis feedback voltage becomes zero and outputting a correction angle, wherein, when the speed of the synchronous motor is equal to or higher than a predetermined threshold value, a value obtained by adding the correction angle to the detected angle of the position detector is taken as a reference phase angle of the first 3-phase/DQ converter, the second 3-phase/DQ converter and the DQ/3-phase converter, when the speed of the synchronous motor is less than a predetermined threshold value, a value obtained by adding a low-speed load angle preset to the detection angle of the position detector is used as the reference phase angle.

Effects Of The Invention

According to the present invention, it is possible to provide a control apparatus for a synchronous motor capable of setting the power factor of the synchronous motor to 1 by a relatively simple method.

EMBODIMENT TO PRACTICE THE INVENTION

Hereinafter, embodiments of the present invention will be described with reference to the drawings.

Embodiment 1

Figure 1:
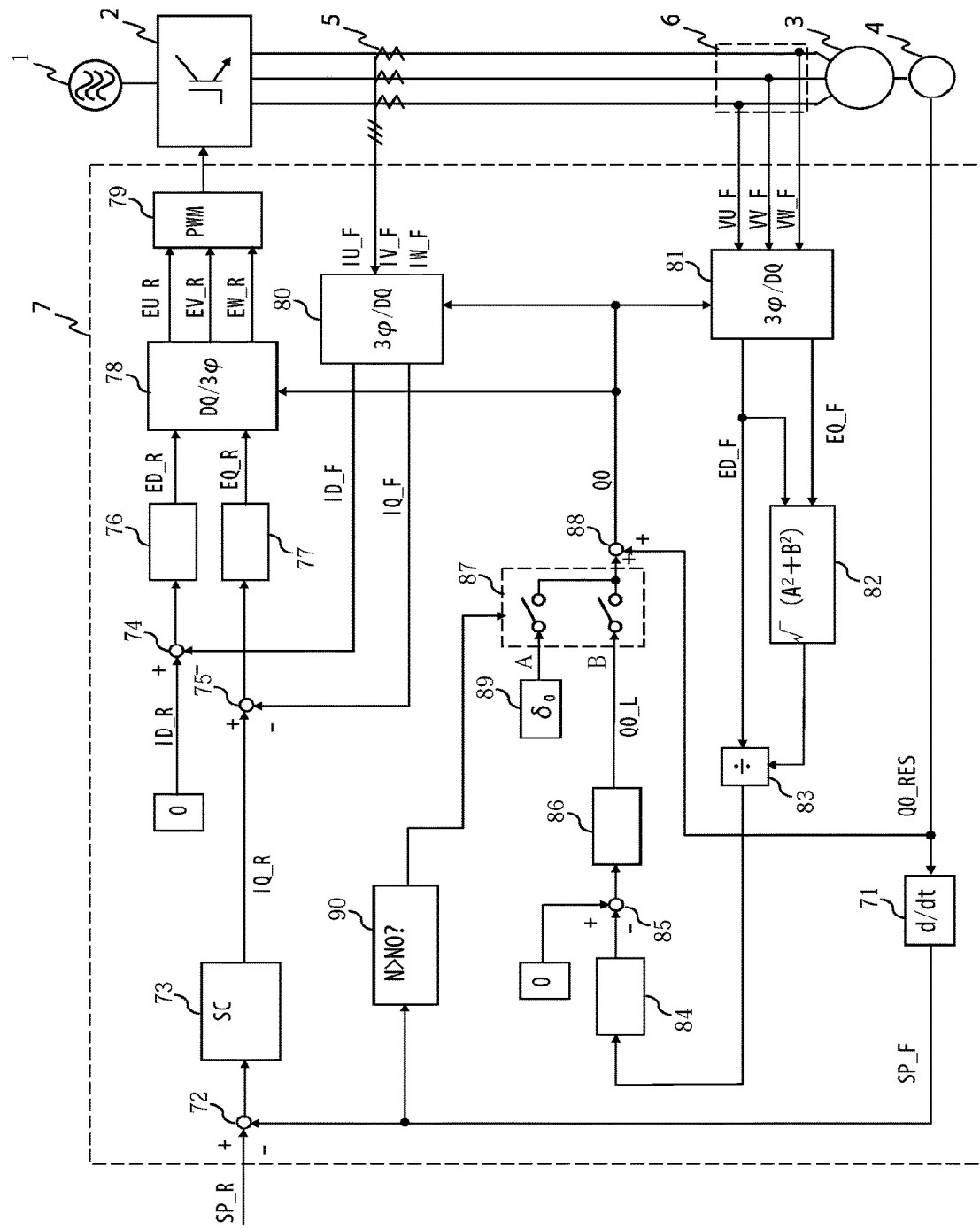
FIG. 1 is a circuit configuration diagram of a control apparatus for a synchronous motor according to a first embodiment of the present invention.
Figure 2:
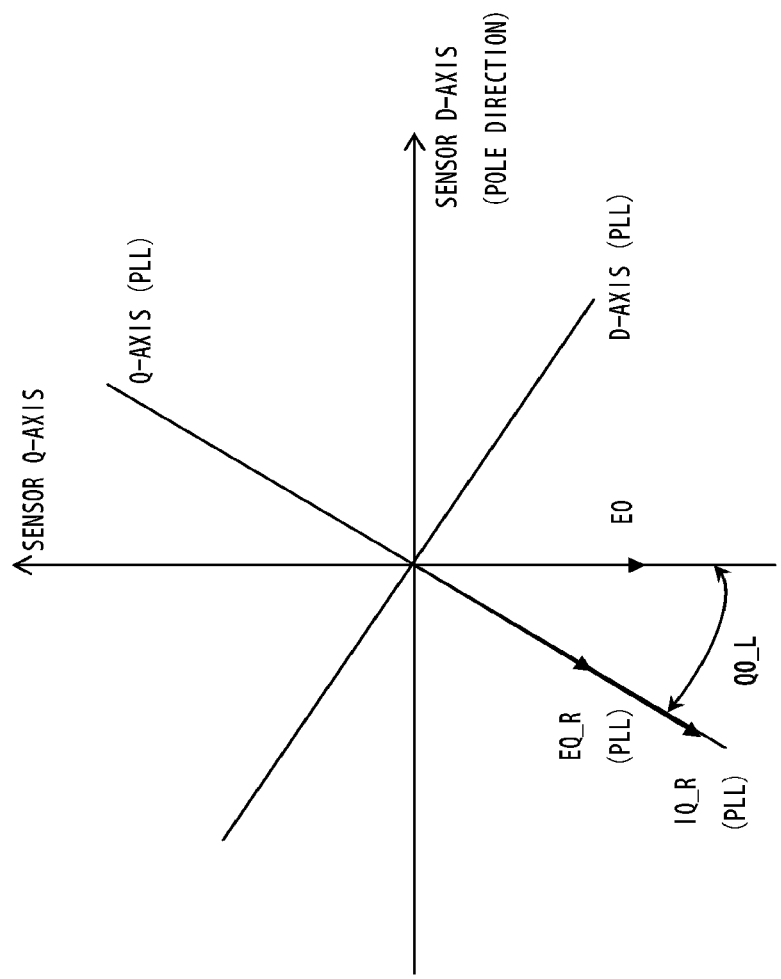
FIG. 2 is an explanatory diagram of a control apparatus for a synchronous motor according to a first embodiment of the present invention.

Hereinafter, a control apparatus for a synchronous motor according to a first embodiment of the present invention will be described with reference to FIGS. 1 to 3. FIG. 1 is a circuit diagram of the control apparatus for a synchronous motor according to a first embodiment of the present invention. An alternating current is supplied from the alternating current power supply 1 to the inverter 2. The inverter 2 has a converter unit (not shown) at its input section. The converter unit converts the input alternating current into a direct current of a desired voltage and supplies the direct current to an inverter unit (not shown). The inverter unit converts direct current into alternating current/voltage to drive the synchronous motor 3. The power devices constituting the inverter unit of the inverter 2 are on/off controlled by the gate signal supplied from the drive controller 7.

The synchronous motor 3 is attached with a resolver 4 as position detection means. The output of the resolver 4 is given to the drive control unit 7 as the phase angle QO_RES. A current detector 5 and a voltage detector 6 are provided on the output side of the inverter 2. The detection current of the current detector 5 is given to the drive controller 7 as current feedback IU_F, IV_F and IW_F. The detection voltage of the voltage detector 6 is given to the drive controller 7 as voltage feedback VU_F, VV_F, and VW_F. The synchronous motor 3 is usually provided with a field winding. For example, an excitation current is supplied to the field winding from the drive controller 7, but the illustration thereof is omitted.

Next, an internal configuration of the drive controller 7 will be described. The phase angle QO_RES obtained by the resolver 4 is converted by the differentiator 71 into speed feedback SP_F. The subtractor 72 calculates the difference between the externally applied speed reference SP_R and the speed feedback SP_F. This difference is given to the speed controller 73. The speed controller 73 is usually a PI controller. Then, the speed controller 73 performs adjustment control so as to minimize the given difference, and outputs the Q-axis current reference IQ_R. Further, the D-axis current reference ID_R is set to zero.

The current value which is the output of the current detector 5 is given to the 3-phase/DQ converter 80. The 3-phase/DQ converter 80 converts this current value into current feedback ID_F and IQ_F of two axes based on reference phase angle QO. Here, ID_F and IQ_F are amounts that does not change with time, and the reference phase angle QO is corrected by adding the correction angle QO_L which is the output of the angle correction selector 87 described later to the phase angle QO_RES detected by the resolver 4 by the adder 88.

The subtractor 74 calculates the difference between the D-axis current reference ID_R set to zero and the D-axis current feedback ID_F. This difference is provided to a current controller 76. Further, the subtractor 75 calculates the difference between the Q-axis current reference IQ_R and the Q-axis current feedback IQ_F. This difference is given to the current controller 77. The current controllers 76, 77 are usually PI controllers. The current controller 76 and the current controller 77 adjust and control so as to minimize the given difference and output the D-axis voltage reference ED_R and the Q-axis voltage reference EQ_R, respectively. The D axis voltage reference ED_R and the Q axis voltage reference EQ_R are applied to the DQ/3-phase converter 78. The DQ/3-phase converter 78 outputs three phase voltage references EU_R, EV_R and EW_R based on the reference phase angle QO. The three-phase voltage references EU_R, EV_R, and EW_R are provided to the PWM controller 79.

The PWM controller 79 supplies a PWM-modulated gate signal to each power device of the inverter unit so that the output voltage of each phase of the inverter unit of the inverter 2 becomes the three-phase voltage reference EU_R, EV_R and EW_R. The three-phase voltages VU-F, VV-F, and VW-F detected by the voltage detector 6 are applied to a 3-phase/DQ converter 81, and these are converted to voltage feedback ED_F and EQ_F of two axes based on the reference phase angle QO. Here, ED_F and EQ_F are amounts that does not change with time. The reference phase angle QO is the phase angle corrected as described above. The D-axis voltage feedback ED_F and the Q-axis voltage feedback EQ_F are provided to the absolute value calculator 82. The D-axis voltage feedback ED_F is divided by the output of the absolute value calculator 82 by the divider 83. That is, the output of the divider 83 takes a constant value regardless of the speed of the synchronous motor 3 with respect to the D-axis voltage feedback ED_F. Namely, it is a normalized value. The output of divider 83 is applied to the negative input of subtractor 85 via a filter 84.

The positive input of the subtractor 85 is given 0. The voltage controller 86, which is a PI controller, adjusts and controls the D-axis voltage feedback ED_F to be 0 and outputs a correction angle QO_L. The correction angle QO_L is supplied to the adder 88 through the B terminal of the angle correction selector 87. Therefore, when the angle correction selector 87 selects the output of the voltage controller 86, the correction angle QO_L is determined such that the D-axis voltage feedback ED_F which is the output of the 3-phase/DQ converter 81 becomes zero by operation of the phase locked loop (PLL). As a result, QO=QO_RES+QO_L is established. The correction angle QO_L corresponds to a load angle that changes according to the load of the synchronous motor 3 as described later.

The angle correction selector 87 is a circuit from which the signal input outputted by the switching speed detector 90 is selected. The angle correction selector 87 outputs a signal input from the A terminal when the output of the switching speed detector 90 is 0, and outputs a signal input from the B terminal when the output of the switching speed detector 90 is 1. The output of the low speed load angle setter 89 is inputted to the A terminal of the angle correction selector 87.

By the way, when the operating speed of the synchronous motor 3 becomes low, an error occurs in the detection voltage of the voltage detector 6. As a result, an error occurs in the correction angle QO_L, and the fluctuation becomes large and becomes unstable. Therefore, the speed feedback SP_F is monitored by the switching speed detector 90, and the switching speed detector 90 outputs 1 when the speed of the synchronous motor 3 is larger than the predetermined speed N0. That is, as described above, the angle correction selector 87 selects the output of the voltage controller 86 (output selection of the B terminal) to operate the PLL described above. When the speed is less than N0, the switching speed detector 90 outputs 0. That is, the angle correction selector 87 selects the low speed load angle $\delta 0$ set by the low speed load angle setter 89 (output selection of the A terminal).

The operation in the above configuration will be described below with reference to a vector diagram shown in FIG. 2. In FIG. 2, the horizontal axis is the sensor D-axis, and the vertical axis is the sensor Q-axis. The sensor D-axis is taken as the magnetic pole direction of the field of the synchronous motor 3. At this time, the induced voltage E0 of the synchronous motor 3 due to the field magnetic pole is in the direction of the sensor Q-axis as illustrated. Further, for example, when the detection phase of the resolver 4 coincides with the sensor Q-axis, it is defined as the detection phase angle QO_RES=0°.

When the PLL as described above operates in this state, the reference phase angle QO for DQ conversion is shifted by the correction angle QO_L. Then, DQ conversion is performed based on orthogonal coordinates of the D axis (in PLL) and the Q axis (in PLL). Here, the output voltage of the inverter 2 at the time of PLL becomes only the Q axis voltage reference EQ_R by the operation of the PLL in which the feedback ED_F is set to 0. Similarly, since control is performed to set the D-axis current reference ID_R to 0 by the current controller 76, the output current of the inverter 2 at the time of PLL is only the Q-axis current reference IQ_R. Therefore, the output voltage and output current of the inverter 2 are in phase, and a power factor of 1 is achieved. Then, as shown in the figure, the correction angle QO_L indicates the phase difference between the terminal voltage of the synchronous motor 3 and the induced voltage, so this correction angle QO_L corresponds to the load angle of the synchronous motor 3.

Figure 3:
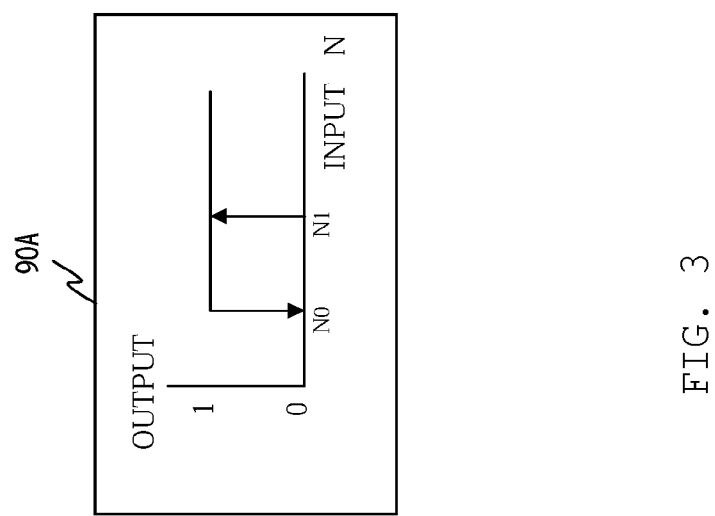
FIG. 3 is a view showing a modified example of the control apparatus of the synchronous motor according to the first embodiment of the present invention.

Next, a modification of the first embodiment is shown in FIG. 3. FIG. 3 shows input/output characteristics of a switching speed detector 90A which is a modification of the switching speed detector 90 in the first embodiment. As shown in FIG. 3, the switching speed detector 90A has a so-called hysteresis characteristic. That is, when the speed is less than N0, the switching speed detector 90 outputs 0 to select the output of the low speed load angle setter 89 (output selection of the A terminal), but when the speed increases and exceeds N0, the output remains at 0, and the output becomes 1 only when the speed reaches N1. Similarly, when the speed is N1 or more, the switching speed detector 90 outputs 1 to select the output of the voltage controller 86 (output selection of the B terminal). When the speed decreases and becomes less than N1, the output remains at 1, and the output becomes 0 only when the speed reaches N0. As described above, when the switching speed detector 90 has a hysteresis characteristic, it is possible to prevent the control from becoming unstable due to unnecessary chattering in the vicinity of the switching speed.

Embodiment 2

Figure 4:
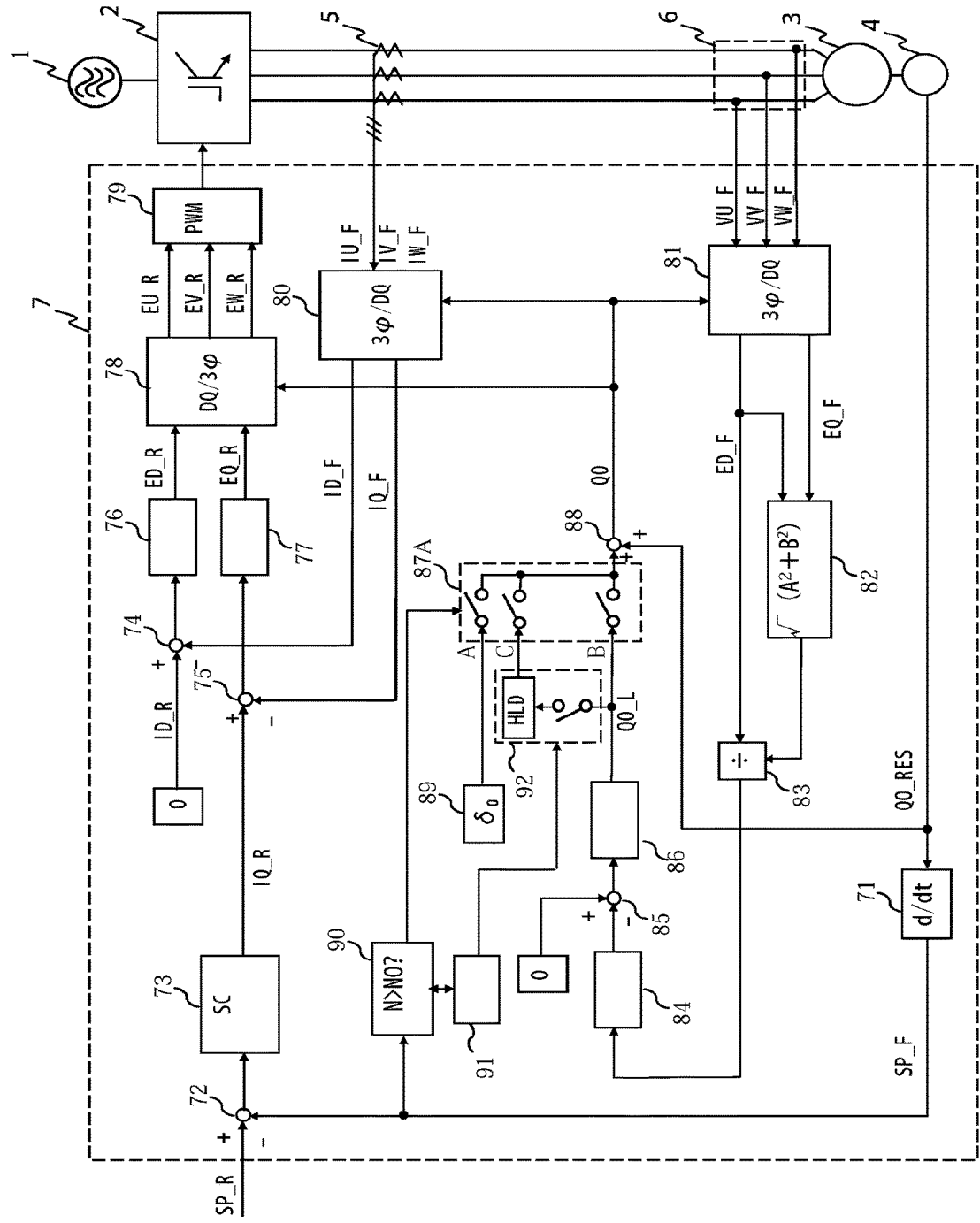
FIG. 4 is a circuit diagram of a control apparatus for a synchronous motor according to a second embodiment of the present invention.

Hereinafter, a control apparatus for a synchronous motor according to a second embodiment of the present invention will be described with reference to FIG. 4. FIG. 4 is a circuit diagram of a control apparatus for a synchronous motor according to a second embodiment of the present invention. About each part of this embodiment 2, the part same as each part of the circuit block diagram of the control apparatus of the synchronous motor based on embodiment 1 of this invention of FIG. 1 is shown with the same code, and the description is omitted. The second embodiment differs from the first embodiment is that a speed decrease switching detector 91 is provided that exchanges information with the switching speed detector 90 and detects the timing immediately before the output of the switching speed detector 90 becomes 1 to 0, and a load angle hold circuit 92 is provided that holds the value of the correction angle QO_L which is the output of the voltage controller 86 in the timing of the output signal of the speed decrease switching detector 91, and the output of the angular hold circuit 92 becomes configured to be selectable by the angle correction selector 87A.

The load angle hold circuit 92 holds and outputs an input signal according to the output signal of the speed decrease switching detector 91. An input terminal C is added to the angle correction selector 87A. The output of the load angle hold circuit 92 is connected to the input terminal C of the angle correction selector 87A. While the output of the switching speed detector 90 is 0 when the operation of the synchronous motor 3 is started, the angle correction selector 87A selects the output of the terminal A, and when the speed of the synchronous motor 3 increases and the output of the switching speed detector 90 becomes 1, the angle correction selector 87A selects the output of the terminal B. Then, when the speed of the synchronous motor decreases and the output of the switching speed detector 90 changes from 1 to 0', the angle correction selector 87A selects the output of the terminal C.

With such a configuration, when the operating speed of the synchronous motor 3 is reduced to N0 which is the switching speed, the correction angle QO_L which is the load angle at that time is held first, and then the speed decrease switching detector 91 changes the output of the switching speed detector 90 from 1 to 0'. The angle correction selector 87A selects the correction angle QO_LH held by the load angle hold circuit 92 instead of the low speed load angle δ0 which is the output of the low speed load angle setter 89 according to the switching output signal 0'. By controlling in this manner, the transient disturbance is suppressed when the low speed load angle δ0 which is the output of the low speed load angle setter 89 is not an appropriate value, and low speed operation can be started with maintaining the power factor 0 when the load change is small.

Embodiment 3

Figure 5:
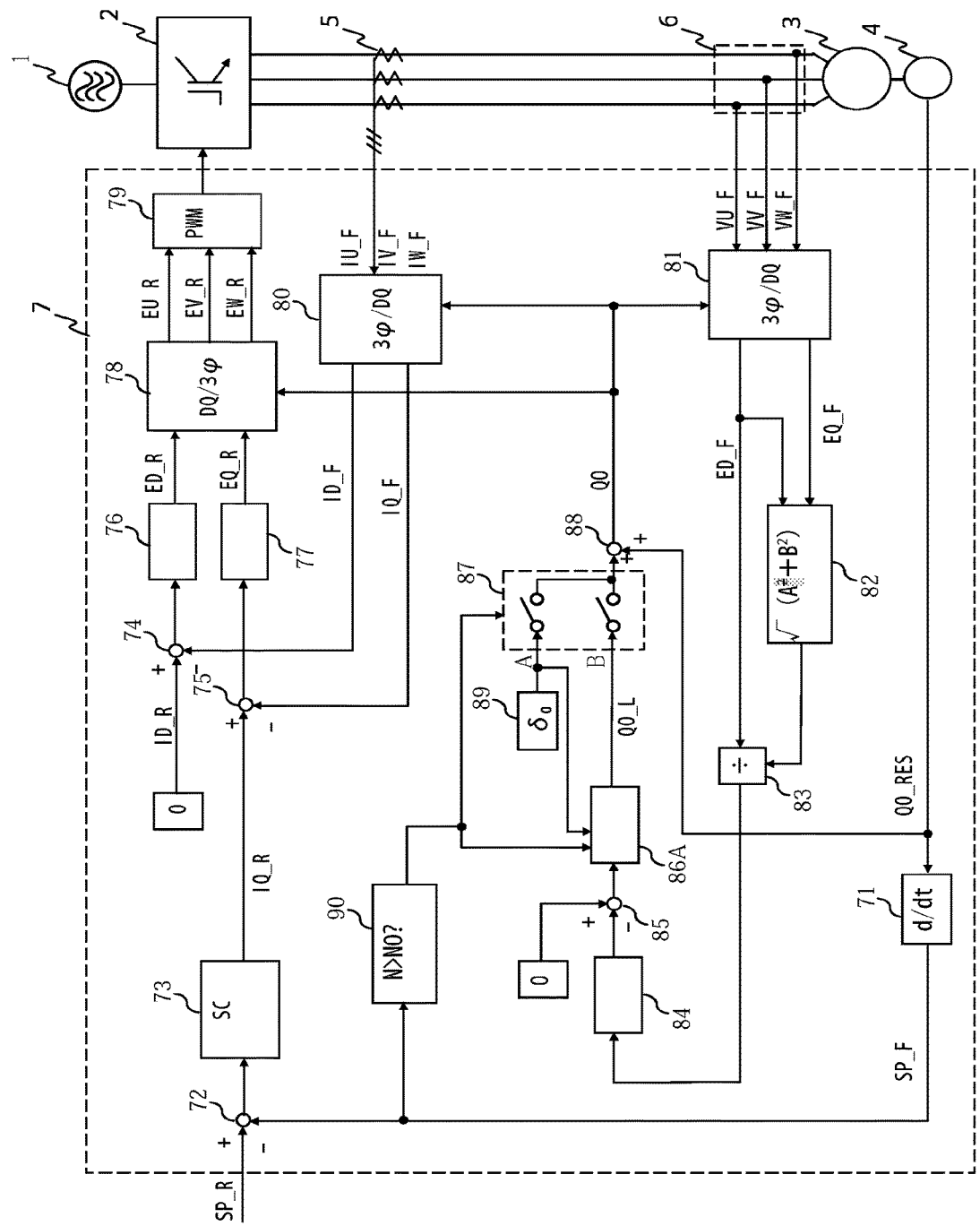
FIG. 5 is a circuit diagram of a control apparatus for a synchronous motor according to a third embodiment of the present invention.

Hereinafter, a control apparatus for a synchronous motor according to a third embodiment of the present invention will be described with reference to FIG. 5. FIG. 5 is a circuit diagram of a control apparatus for a synchronous motor according to a third embodiment of the present invention.

About each part of this embodiment 3, the part same as each part of the circuit block diagram of the control apparatus of the synchronous motor based on embodiment 1 of this invention of FIG. 1 is shown with the same code, and the description is omitted. The difference of this third embodiment from the first embodiment is as follows.

That is, the voltage controller 86A, which is a PI controller, is provided with an initial value setting input terminal capable of setting an initial value of the integration circuit of PI control and an enable terminal of the integration circuit. Then, when a signal from the enable terminal is established, the voltage controller 86A is configured to start PI control with the signal from the initial value setting input terminal as the initial value of the integration circuit. The low speed load angle 50 which is the output of the low speed load angle setter 89 is connected to the initial value setting input terminal, and the output of the switching speed detector 90 is given to the enable terminal of the voltage controller 86A.

With such a configuration, the initial value of the output of the voltage controller 86A becomes equal to the low speed load angle δ0. When the operating speed of the synchronous motor 3 accelerates from the start up to become the switching speed N0 or N1, the output of the switching speed detector 90 changes from 0 to 1. At this time, the initial value of the output of the voltage controller 86A is equal to the low speed load angle δ0. Therefore, even if the angle correction selector 87 changes the selection of the input signal from the A terminal which is the output of the low speed load angle settter 89 to the B terminal which is the output of the voltage controller 86A, the output of the angle correction selector 87 is not cause discontinuous change.

When the angle correction selector 87 selects the output of the voltage controller 86A, a PLL operation to set the D-axis voltage feedback ED_F to zero is started. By adopting the configuration of the third embodiment, it is possible to smoothly switch the load angle by the switching speed detector 90 and the angle correction selector 87 at the time of speed increase.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, a speed detector may be used instead of the resolver 4 of FIG. 1. In that case, the speed feedback is integrated to obtain detection angle information.

Further, since the filter 84 in FIG. 1 removes harmonics such as carrier of PWM control, it may be inserted into the input side or the output side of the 3-phase/DQ converter.

Normally, low speed load angle δ0 is set to a predetermined value from the load characteristics of the load driven by the synchronous motor 3, but it can be used the correction angle QO_LH held by the load angle hold circuit 92 described in the second embodiment. When the load characteristics change depending on the operating conditions, the low speed load angle δ0 may be automatically updated to a new correction angle QO_LH each time the synchronous motor 3 is repeated.

Furthermore, it is clear that it is possible to carry out by combining the embodiment 2 and the embodiment 3.

DESCRIPTION OF THE SYMBOLS

1 AC power supply
2 Inverter
3 Synchronous motor
4 Resolver
5 Current detector
6 Voltage detector
7 Drive controller
71 Differentiator
72 Subtractor
73 Speed controller
74, 75 Subtractor
76, 77 Current controller
78 DQ/3-phase converter
79 PWM controller
80, 81 3-phase/DQ converter
82 Absolute value calculator
83 Divider
84 Filter
85 Subtractor
86, 86A Voltage controller
87, 87A Angle correction selector
88 Adder
89 Low speed load angle setter
90, 90A switching speed detector
91 Speed decrease switching detector
92 Load angle hold circuit

The invention claimed is:
1. A control apparatus for a synchronous motor having an inverter that converts power supplied from an AC power supply into a desired output voltage and frequency to drive a synchronous motor;
a current detector for detecting the output current of the inverter;
a voltage detector for detecting an output voltage of the inverter;
a. position detector for detecting the rotation angle of the synchronous motor;
a drive controller that controls an output of the inverter, the drive controller comprising:
a speed controller for controlling the speed feedback obtained by differentiating the output of the position detector to be a predetermined speed reference and outputting a Q-axis current reference;
first 3-phase/DQ converter for obtaining a Q-axis feedback current and a D-axis feedback current by converting the detected current of the current detector into 3-phase/DQ converter;
a Q-axis current controller for controlling the deviation between the Q-axis current reference and the Q-axis feedback current to be zero and outputting a Q-axis voltage reference;
a D-axis current controller for controlling the D-axis feedback current to be zero and outputting a D-axis voltage reference;
a DQ/3-phase converter for DQ to 3-phase conversion of the Q-axis voltage reference and the D-axis voltage reference to obtain voltage reference of each phase of the three-phase output of the inverter;
a PWM controller for PWM controlling the voltage reference of each phase and outputting a gate signal to switching elements constituting the inverter;
second 3-phase/DQ converter for obtaining a Q-axis feedback voltage and a D-axis feedback voltage by converting the detection voltage of the voltage detector into 3-phase/DQ converter;
a voltage controller for PI control so that the D-axis feedback voltage becomes zero and outputting a correction angle;
wherein, when the speed of the synchronous motor is equal to or higher than a predetermined threshold value, a value obtained by adding the correction angle to the detection angle of the position detector is taken as a reference phase angle of the first 3-phase/DQ converter, the second 3-phase/DQ converter and the DQ/3-phase converter, when the speed of the synchronous motor is less than a predetermined threshold value, a value obtained by adding a low-speed load angle preset to the detection angle of the position detector is used as the reference phase angle.
2. The control apparatus for a synchronous motor according to claim 1,
wherein, the predetermined threshold has a hysteresis characteristics, and when the speed of the synchronous motor is less than the first set speed, a value obtained by adding the low speed load angle to the detection angle of the position detector is taken as the reference phase angle, and when the speed of the synchronous motor increases and becomes to the second set speed, a value obtained by adding the low-speed load angle to the correction angle is set as the reference phase angle, and when the speed of the synchronous motor is equal to or higher than the second set speed, a value obtained by adding the correction angle to the detection angle of the position detector is used as the reference phase angle, and the detection angle of the position detection means is detected only when the speed of the synchronous motor falls below the first set speed.

3. The control apparatus for a synchronous motor according to claim 1,
wherein, the drive controller hold the output of the voltage controller when the synchronous motor decelerates and its speed falls below the predetermined threshold, and uses the held correction angle instead of the low speed load angle.

4. The control apparatus for a synchronous motor according to claim 1,
wherein, the drive controller set the initial value of the integral output of the voltage controller to the low speed load angle, when the synchronous motor accelerates and its speed is above the predetermined threshold, and after that, a value obtained by adding the correction angle to the detection angle of the position detector is used as the reference phase angle.

5. The control apparatus for a synchronous motor according to claim 2,
wherein, the drive controller hold the output of the voltage controller when the synchronous motor decelerates and its speed falls below the predetermined threshold, and uses the held correction angle instead of the low speed load angle.

6. The control apparatus for a synchronous motor according to claim 2,
wherein, the drive controller set the initial value of the integral output of the voltage controller to the low speed load angle, when the synchronous motor accelerates and its speed is above the predetermined threshold, and after that, a value obtained by adding the correction angle to the detection angle of the position detector is used as the reference phase angle.

7. The control apparatus for a synchronous motor according to claim 3,
wherein, the drive controller set the initial value of the integral output of the voltage controller to the low speed load angle, when the synchronous motor accelerates and its speed is above the predetermined threshold, and after that, a value obtained by adding the correction angle to the detection angle of the position detector is used as the reference phase angle.

8. The control apparatus for a synchronous motor according to claim 5,
wherein, the drive controller set the initial value of the integral output of the voltage controller to the low speed load angle, when the synchronous motor accelerates and its speed is above the predetermined threshold, and after that, a value obtained by adding the correction angle to the detection angle of the position detector is used as the reference phase angle.

* * * * *